United States Patent [19]
Hunter

[11] Patent Number: 5,868,082
[45] Date of Patent: Feb. 9, 1999

[54] DUAL FUEL FLUIDISED BED GASIFICATION/COMBUSTION SYSTEM

[76] Inventor: John Hunter, 34 Cainus Ave, Edinburgh EH10 6QU, Scotland

[21] Appl. No.: 491,694

[22] Filed: Jun. 19, 1995

[51] Int. Cl.⁶ .................................................... F23G 5/00
[52] U.S. Cl. ......................... 410/229; 110/245; 122/4 D
[58] Field of Search .................................... 110/235, 243, 110/244, 245, 344, 345; 60/39.12, 39.464, 39.35

[56] References Cited

U.S. PATENT DOCUMENTS

| | | | |
|---|---|---|---|
| 5,050,374 | 9/1991 | Hunter | 60/39.02 |
| 5,095,854 | 3/1992 | Dietz | 122/4 D |
| 5,218,932 | 6/1993 | Abdulally | 122/4 D |
| 5,325,797 | 7/1994 | Mei et al. | 110/245 |

Primary Examiner—John M. Sollecite
Assistant Examiner—Pamela A. O'Connor

[57] ABSTRACT

A dual fuel gasification-combustion system (44) with multi-stage fluidised bed gasifier (32) for complete carbon conversion of the input fuel using single or combineable oxidants and sulphur sorbents to produce a clean fuel gas and combustion gas at any pressure for use with boilers gas turbines,or, combined cycle gas-steam turbines.The application (44) for combined cycle power includes a multi-stage gasifier (32) with design number of stages to maximise carbon conversion of input liquid or solid fuels being connected to a gas turbine (53) via gas cleaners (45),(47) and afterburner (46) to produce a clean combustion gas entering the gas turbine. The system has coolant conduits (6) in the gasifier and in the afterburner at (50) and generated steam from the boiler (54) for the steam turbine (51). The system also includes fuel storage and delivery system (38) and storage and seperation unit (39) for seperation of carbon from ash and spent sorbent,the latter regenerated for re-use in the gasifier or for disposal;booster burners (59) as alternative to burn off minor amounts of carbon from seperation unit (39).Embodiments of the system are described with accompanying drawings.

3 Claims, 7 Drawing Sheets

DUAL FUEL FLUIDISED BED GASIFICATION/COMBUSTION SYSTEM

This invention relates to a dual fuel multi-chamber fluidised bed gasification/combustion system for all types of non-gaseous fuels with single or combinable oxidants and sulphur sorbents to produce a clean fuel/combustion gas at atmospheric or pressurised gas pressure depending on the application.

The system produces clean fuel/combustion gases containing low levels of sulphur and nitrogen oxides and solids content and has many applications, for new and retrofit plant, including direct firing of gas turbines,steam generation for steam turbines, combined cycle gas and steam turbines,firing of industrial and power station boilers, furnaces,driers etc.It can also be used to generate fuel gas for use in marine rail and road power drive units.

Conventional gasifiers are of the fixed bed type single fluidised bed type ,or, spouted bed type.

The fixed bed type,using solid fuel,is selective in the type and size of fuel it can gasify.For example, it can only utilize premium cost graded coals at relatively low gasification rates per $m^2$ bed cross-sectional area. Its capital cost and operational running costs are thus very high and tend towards being uneconomic at to-day's costs.

Single fluidised bed gasifiers produce fuel gas at higher gasification rates per $m^2$ distribution bed area but at the design fluidisation velocity limit elutriated ungasified carbon particles flow into the freeboard space tends to be high.Furthermore,carbon conversion in moles per mole of the input fuel is low,thus requiring an additional combustor unit to burn-off the resultant ungasified carbon char.

In the spouted jet gasifier special design precautions have to be made to ensure proper flow of ash/carbon, agglomerated particles from the base of the gasifier. Again ungasified elutriated carbon particles tend towards an high rate of flow into the freeboard volume above the bed.

In the three types of gasifiers seldom are purposed design coolant systems adopted to preclude fusion of the ash in the input fuel.Instead low equivalence ratios (i.e. ratio of air/fuel to the ratio at stoichiometric conditions) are adopted,thus resulting in reduced exothermic heat release rates per kg of fuel input into the bed and reduced production of fuel gas per kg of fuel input.

In summary it would appear conventional gasification technology fails to achieve high carbon coversion of the input fuel and the requirement of a seperate combustor to burn-off the resultant carbon char;bed temperatures are difficult to control and with difficulty through adoption of low design equivalence ratios releasing low rates of exothermic heat release per kg of input fuel and consequently low rates of fuel gas production per kg of input fuel;in addition,fuel gas calorific values are relatively low for a given class of oxidant used. Furthermore,most designs are restricted to the gasification of only one type of input fuel,usually coal or coke.

It is an object of the present invention to provide a gasification/combustion system which obviates,or, mitigates,at least one of the aforementioned problems.

According to a first aspect of the invention there is provided a gasifier for use in a gasification system, said gasifier having fuel inlet means for being coupled to a non-gaseous fuel source and outlet means for providing fuel gas to a gasification location a series of adjacent parallel fluidised bed gasification chambers ,said chambers being disposed in individual plenum chambers,each of the latter fitted with a control damper controlling the distribution of the oxidant supply from an adjacent oxidant supply plenum chamber with flanged inlet means, a freeboard chamber disposed in proximity to the said fluidised beds and said outlet means,said fluidised bed chambers fitted with distributor means disposed at the base of said chambers and interposed between the said chambers and the said individual plenum chambers, a transfer unit fitted under the dividing wall of each fluidised bed chamber and adjacent to said distributor means,whereby,ungasified carbon and ash and spent sorbent is transferred to the next adjacent chamber for gasification of the said ungasified carbon along with any fresh input fuel fed to the fluidised bed chambers, said fluidised bed chambers each receiving oxidant supply through inlet supply plenum chamber,from a fan/compressor unit,or other means (not shown)into said individual damper controlled plenum chambers,thence up through said distributor means thus fluidising and converting said input fuel and ungasified carbon into fuel gas,the collected fuel gas flowing into said freeboard chamber in which further gasification of ungasified carbon particles, elutriated from the said fluidised bed chambers,takes place, thence total fuel gas flowing through said outlet means to said gasification location, successive gasification of input fuel and ungasified carbon taking place in each fluidised bed chamber,the final said chamber provided with no input fuel means,its main purpose being to gasify any remaining ungasified carbon transferred from the previous said fluidised bed chambers and by the said transfer unit,transfer the total carbon free ash and spent sorbent into a lockseal hopper arrangement for dust free disposal of the said ash, and sorbent either,pneumatically, along an ash pipe,or by other means.

Preferably said gasifier further comprises fluidised bed cooling means for maintaing the temperature of said fluidised beds within a predetermined temperature range below the ash fusion temperature of the input fuel.

Preferably,also,said fluidised bed chambers cooling means includes cooling fluid conduits coupled to a source of cooling medium,said conduits being dimensioned and proportioned so that the overall thickness of the fuidised beds is minimised to minimise the gas pressure drop across the said fluidised beds consistent with providing sufficient conduit cooling surface to control the temperature of said fluidised beds in balance with the exothermic heat release within said fluidised beds.

Conveniently said fuel inlet means for solid fuel consists of helical screws fitted within enclosed tubes with the outlet feeding the said fuel through the roof of the said freeboard chamber directly onto the appropriate fluidised bed below;other equivalent means are possible.

Conveniently,also,fuel inlet means for liquid fuels consists of an inlet conduit with branch conduits under each said distributor means through said conduits flows liquid fuel through a non-return valve, and enters the said fluidised bed chambers through a distributor head to spread the said liquid fuel throughout the said fluidised beds.

Advantageously a parallel conduit with integral non-return valve is disposed adjacent to the fuel inlet means for liquid fuels and linked to it by a common opening and includes a first auxiliary inlet means for introducing a pre-ignition means of ignition gas mixture into said gasifier and a second auxiliary inlet means for introducing an inert gas into said gasifier to purge the said gasifier of combustion fuel.

Advantageously also ignition means are disposed adjacent to said parallel conduit adjacent to the integral non-return valve and common opening of the first auxiliary means to allow pre-ignition of said mixture.

Conveniently said ignition means is provided by retractable spark plug.

Preferably said parallel conduit is coupled to a third auxiliary inlet means for introducing steam to provide a fuel-steam mixture from said inlet means for solid or liquid fuels to said fluidised beds.

Advantageously said fuel inlet means for solid fuel is coupled to a lockseal hopper arrangement(not shown) from which fuel is delivered to said fuel inlet means and thence to said fluidised bed chambers and lockseal hopper means being sealed to prevent escape of compressed air.

Advantageously said distributor means for each said fluidised bed is sized to give a fluidisation actual velocity much lower than is the case in normal conventional fluidised bed unit designs,the aim to minimise elutriation of carbon/ash particles from the said fluidised beds and maximise carbon conversion of the said input fuel.

Advantageously a computerised control system coupled to all relevant control units controlling flow of fuel, steam, oxidant supply,optimising carbon/ash transfer and fuel gas calorific value of the fuel gas flowing out of the said gasifier.

Advantageously said fuel inlet means and said lockseal hopper arrangement includes means to supply a suitable sorbent such as limestone into the said fluidised beds whereby when reacted with the said input fuel(solid or liquid) at relatively low temperature the sulphur in the fuel is absorbed by the sorbent to substantially reduce emissions of sulphur and nitrogen oxides from the said gasifier.

Progressively as gasification proceeds in the said fluidised beds the latter tend towards saturation with bed material comprising spent sorbent,ungasified carbon and fuel ash and on reaching a given level of saturation a proportion of the said bed material drops out of the bed onto the surface of the said transfer unit,because no fluidising oxidant flows up through it,thence when this occurrs the said transfer unit switches on and conveys the said proportion of bed material into the adjacent fluidised bed,thus in this way successive transfer of bed material including ungasified carbon moves through the said gasifer until it reaches the exit of the said gasifer.

According to a second aspect of the invention there is provided a gasification and combustion system for gasifying a non-gaseous fuel,said gasification and combustion system comprising fuel storage and delivery means for storing and delivering a non-gaseous fuel to a gasifier, a gasifier for receiving said non-gaseous fuel to be gasified and for providing a gasified fuel output, gas cleaning means for cleaning the gasified fuel output by removing ungasified fuel particles and ash particles and spent sorbent, afterburner means coupled to said outlet of gas cleaning means and to user appliance inlet for burning off fuel gas and,if required,adding a staged volume of dilution gas so that the volume and temperature of gas supplied to the said user appliance is maintained at predetermined levels.

Preferably said gas cleaning means coupled to outlet of said gasifier consists of cyclones (or equivalent).

Alternatively for refined gas cleaning the means consists of ceramic porous filter units,one interposed between outlet of said afterburner and inlet of said user appliance,and the other,between outlet of said gasifier and inlet to said afterburner.

Advantageously storage and seperation means are coupled to said gas cleaning means and said afterburner whereby ungasified carbon,ash and spent sorbent are transferred to said storage and seperation means and the ungasified carbon is seperated and fed back to the said afterburner for combustion of said ungasified carbon.

Preferably,also,gas cooling means are coupled to said gasifier and said afterburner whereby gas passing through said gasification/combustion system is cooled to a temperature level suitable for being supplied to said user appliance.

According to a third aspect of the present invention there is provided a method of gasifying and combustion of a fuel input to provide a sufficiently clean gas at desired pressure and temperature to a gas turbine or engine,said method comprising the steps of gasifying a non-gaseous fuel, increasing the residence time of the fuel in the gasifier to maximise carbon conversion by successively transferring the input fuel and carbon from said fluidised bed chambers to gasify said fuel and ungasified carbon, cleaning said gasified fuel,burning off resultant fuel gas from said input fuel to provide a treated gas and, adding a volume of dilution gas for providing a supply gas to a gas turbine or engine at a predetermined volume and temperature and pressure.

Preferably said method includes the steps of collecting uncombusted particles,seperating said uncombusted particles and combusting the said particles.

Preferably also said method includes the step of cooling said gasified fuel to provide a gas at desired temperature.

According to a fourth aspect of the present invention there is provided a method of gasifying fuel in a a gaifier comprising the steps of:

supplying a particulate fuel over and through a freeboard space and into selected,seperate,fluidised bed chambers, alternatively for gasifying liquid fuels supplying said liquid fuel through a conduit with a parallel conduit supplying steam said steam and liquid fuel mixing in a distributor head located in said fluidised bed chambers, supplying an oxidant to said fluidised bed chamber controlling the flow of said oxidant through said fluidised bed chambers distributors and individual plenum chambers by a damper control system fitted to inlet of said plenum chambers, said flow of oxidant through said distributors controlled to give lower than normal fluidisation velocity through said distributors to minimise elutriation of particulate particles from surfaces of said fluidised beds.

modulating total fuel gas output from said gasifier by modulating said fluidising velocity and by starting up or taking out individual fluidised bed chambers thus resulting in a design turndown ratio of fuel gas output dependent on the number of said fluidised bed chambers in the overall design of gasifier.

According to a fifth aspect of the present invention there is provided the said gasifier gasifying two input fuels simultaneously to a purpose designed gasifier,one input fuel being a particulate fuel and the other a liquid fuel,or, an emulsion fuel.

According to a sixth aspect of the present invention there is provided the said gasification/combustion system for atmospheric or pressurised gas pressure providing a fuel/combustion gas at a predetermined temperature and pressure to a user appliance system such as a gas turbine/steam turbine combined cycle system the said gas turbine exhausting waste combustion gases to an integral steam boiler, recovering waste heat to generate steam in said boiler,said waste heat augumented with combustion heat from booster clean gas burners fitted to said boiler,such overall system generating electrical power with lower levels of emissions of sulphur and nitrogen oxides and $CO_2$, such method of providing clean gas booster burners can be adopted for any of the gasification/combustion sytems mentioned in this specification.

According to a seventh aspect of the invention there is provided an atmospheric/pressurised gasification/combustion system for gasifying a non-gaseous fuel for retrofit or new boiler plant andm associated steam cycle turbines integrated with gas turbine plant for conversion to a combined cycle power generation system, a gasifier for receiving said non-gaseous fuel to be gasified and for providing a gasified fuel output, a rear gas cleaning means for cleaning the gasified fuel output by removing ungasified fuel particles,ash particles and spent sorbent, afterburner means coupled to said outlet of gas cleaning means and to said boiler plant inlet for burning off the fuel gas from oxidant supplied by associated fan unit.

Preferably said gas cleaning means coupled to outlet of said gasifier consists of cyclones or,alternatively, ceramic filter porous units.

Advantageously storage and seperation means are coupled to said gas cleaning means and said afterburner whereby ungasified carbon,ash and spent sorbent are transferred to said storage and seperation means and the ungasified carbon is seperated and fed back to said afterburner for combustion therein.

Preferably gas cooling means consisting of hot fluid tubes,or coils,selectively,providing in all or some,of the said gasifier,afterburner and exhaust duct of said gas turbine to provide clean,pressurised,hot fluid (such as air) to the inlet of said gas turbine thereby generating additional electrical power.

These and other aspects of the present invention will become apparent from the following descriptions when taken in combination with the accompanying drawings in which:

Figure 1:
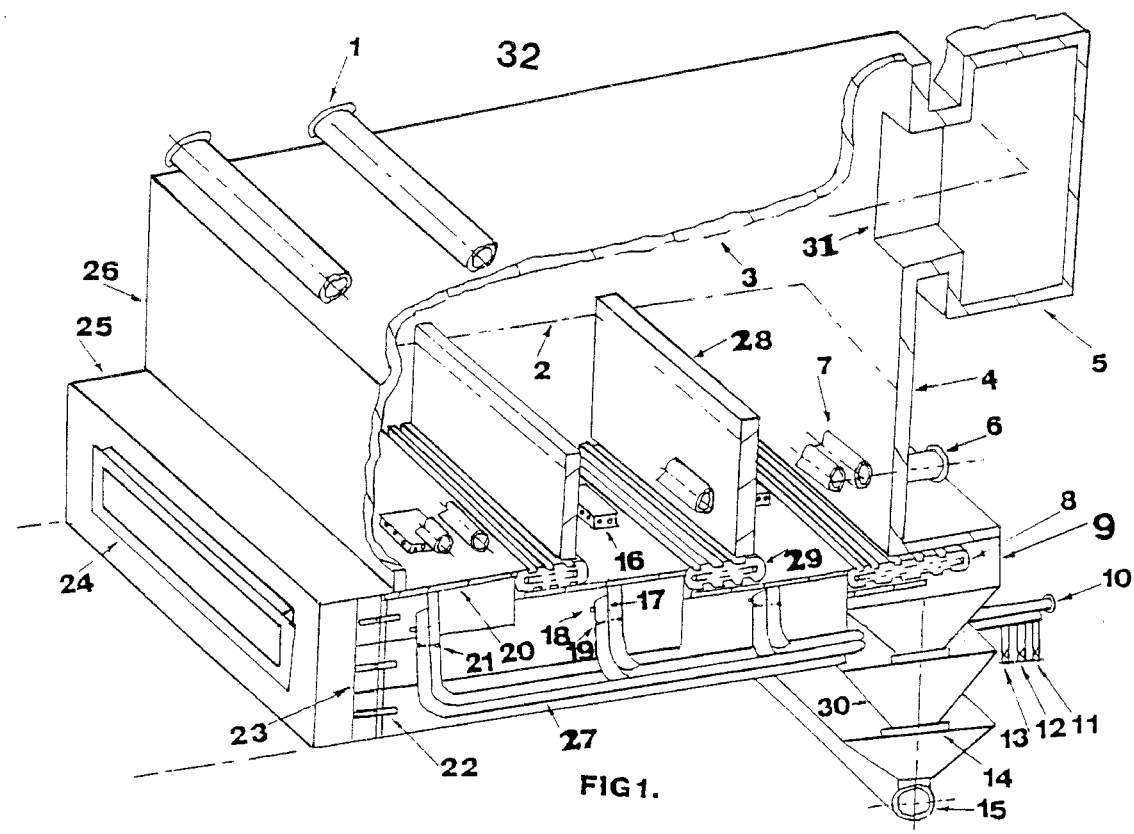
FIG. 1 is a perspective drawing showing the detailed components of the dual fuel gasifier.
Figure 6:
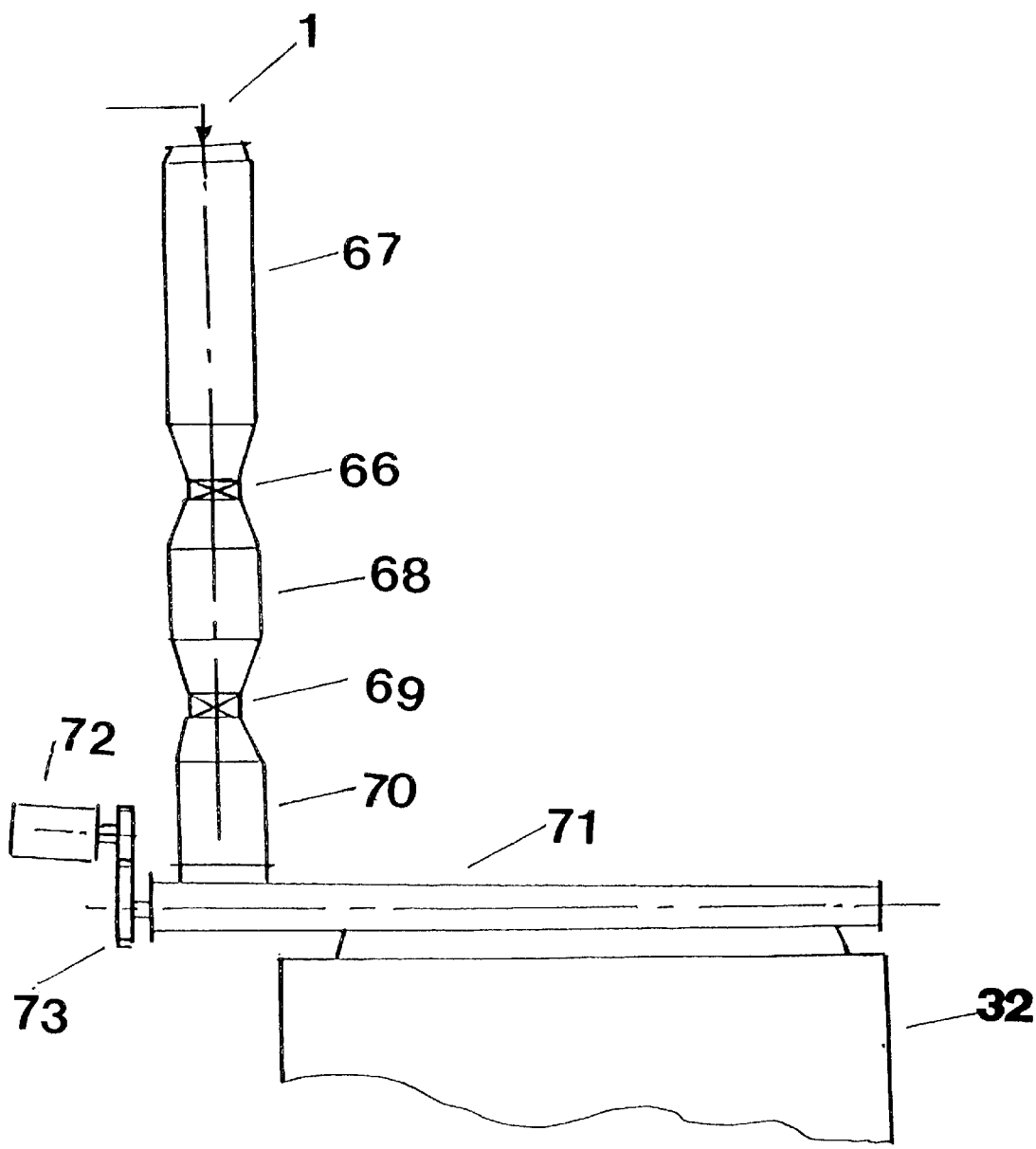
FIG. 6 shows a lockseal hopper for the feeding of fuel and sorbent input into the dual fuel gasifier.

Reference is firstly made to FIG. 1 of the drawings which shows a perspective drawing of the components making up the dual fuel gasifier,generally indicated by the reference number 32 and forming part of the gasification/combustion system.The gasifier 32 comprises a rectangular outer shell 26 lined internally with insulating backed firebrick walls.The shell is fitted with internal walls 28 sub-dividing and forming fluidised bed gasification chambers 4,the number of said chambers determing the required turndown ratio of the gasifier.The horizontal space volume 3 forms the freeboard chamber in which any carbon particles elutriated from the gasification chambers 4 are further gasified in the horizontal flow path to the fuel gas exit duct 5.The latter collects all the fuel gas generated flowing from the gasifier and passes it to the gas cleaning system.The gasification chambers 4 comprise individual porous distributors 20 and the fluidised beds 2 have installed in them a coolant tube system 6 and 7,the coolant flow cooling the said fluidised beds by the said coolant flow absorbing excess exothermic heat release from the beds during the gasification process,thus maintaining the beds at a constant design temperature at all times, and precluding the fusion of any ash particles in the beds.The oxidant supply (which can range from air to pure oxygen)is conveyed through a flanged inlet duct 24 and common plenum chamber 25 to individual plenum chambers 23,each said individual chamber controlling said oxidant flow through them by control dampers 22. Said oxidant flowing through each gasification chamber distributor 20 thence up through the fluidised bed 2 fluidising the bed contents comprising the input fuel, sorbent and the bed ash.Each fluidised bed will be capable of gasifying the volatile matter in the fuel,any moisture and a proportion of the carbon,any remaining ungasified carbon and ash and spent sorbent being transferred to the next gasification chamber by the intermittent or slow continuous movement of the transfer unit 29. This process is repeated for each active gasification chamber untill the ungasified carbon,ash and spent sorbent remaining, reaches the last gasification chamber. Here there is no fuel input; its purpose being to finally gasify any remaining carbon char transferred from the other gasification chambers.Finally there is ejected the spent sorbent and ash through the transfer chain unit 8 into the lockseal hopper arrangement 9 falling successively into two other hoppers 30 with outlet valves 14,the latter valves opening and shutting out of phase to admit and eject such material into each hopper 30 successively thus forming a lockseal hopper arrangement which isolates it from the gasifier as such.The spent ash and sorbent material and minor proportion of carbon is finally ejected into the pneumatic flow pipe 15 which transfers it to a storage/seperation unit 39 indicated in FIGS. 2,3 and 4. The storage/seperation unit 39 comprises a double cyclone unit connected in series.Here any seperated carbon is recycled back to the afterburner 35 or the storage hopper 38.The seperated spent sorbent flows into a regenerator (not shown)and after regeneration flows back to the gasifier for re-use. The fuel input comprises two different systems.The first for particulate,or,solid fuels,comprises a central lockseal delivery/storage hopper arrangement delivering the said fuel to the helical screws 1 enclosed in tubes. The lockseal hopper, shown in FIG. 6, allows for the input of fuel and sorbent. The lockseal comprises a top inlet hopper superimposed onto another outflow valve, leading into an intermediate hopper, and then superimposed onto another outflow valve leading into a base hopper. The base hopper is connected to a helical screw casing. The screw, which runs through the motor and the gear drive, collects the input fuel and sorbent from the base hopper allowing these input materials to flow into the gasifier 32. Recycled carbon may also be mixed in with the input fuel and the sorbent, which may then be fed into the gasifier. The lockseal system operates by the outflow valves which open and close out of phase with one another. This ensures a lockseal condition in the gasifier chambers, precluding escape of fuel gas from the gasifier under all conditions of operation.

Figure 7:
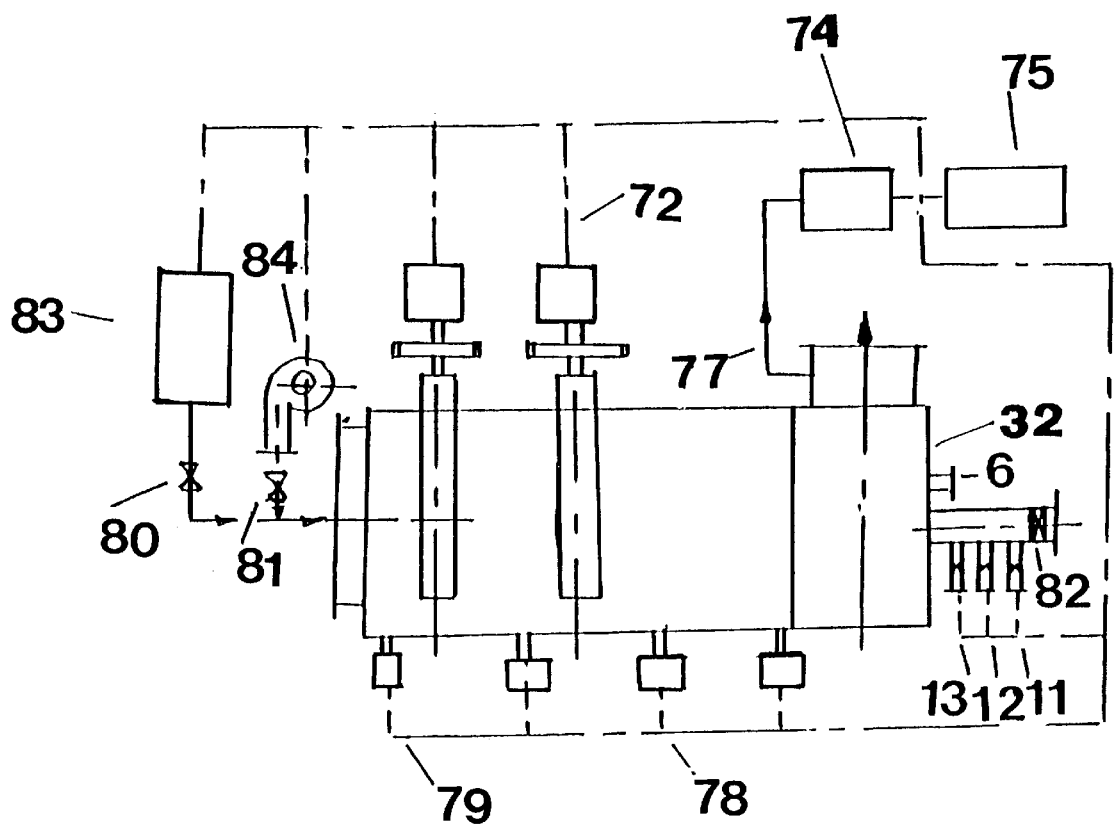
FIG. 7 shows a programmable computer control unit for automatic operation of the dual fuel gasifier.

FIG. 7 shows a programmable computer control unit for automatic operation of the gasifier 32 including start up and shut down procedures; and additionally, providing safety procedures in the event of an emergency closedown. The computer control unit comprises a probe analyzer including a probe tube and temperature thermocouples, for continuous analysis and temperature registering of the key pre-set data values of the fuel gas flow leaving the exit duct of the gasifier 32. The probe analyzer is incorporated into the computer control unit and pre-set with an optimum value of the key component analysis and the temperature. The computer and the probe analyzer are electronically connected to the transfer unit motor, screw feed motors, oxidant inlet damper motors, steam control valve, inert gas valve, ignition gas valve, oxygen generator valve, air fan and a second auxiliary valve means; and, in the event that the input fuel involves liquid fuel, an inlet control pump motor and a third valve means may be implemented. Thus, if the probe analysis and the temperature shows an imbalance from the pre-set values, of the key component data, the computer then signals the appropriate control unit, or units, for the purpose of modulating the input fuel supply, oxidant supply and steam supply; or further, to modulate the speed of the transfer units. The total effect of all this would be to correct the imbalance which has been determined through the key component data; therefore, ensuring as near as possible, a constant calorific value and temperature of he fuel gas flow leaving the gasifier. The screws are located above the active,fluidised beds 2 and deliver the fuel by it falling through the freeboard space 3 onto each bed wherein the fuel is gasified as heretofore described. The second fuel input system is for liquid fuels such as heavy fuel oil.The fuel flows through an inlet conduit 10 with branch conduits,fitted with non-return valves 21,leading up through each gasification chamber distributor 20 to be gasified in combination with a steam supply through distributor heads 16 located on the surface of each active distributor 20.A parallel conduit 27 with integral non-return valve 19 is disposed adjacent to the fuel inlet conduit 10 and linked to the latter by a common opening 17.A first auxiliary inlet means 11 is provided at the entrance to the parallel conduit 27 for introducing a pre-ignition mixture to preheat the gasification fluidised bed material to bring it up to temperature prior to admitting input fuel upon which self sustaining gasification takes place,following which, the pre-ignition mixture is switched off.To ignite the pre-ignition mixture a retractable spark plug at 18 is provided.A second auxiliary means 12 is provided at the entrance to the parallel conduit 27 for introducing an inert gas such as nitrogen into the fluidised bed gasification chambers to purge the beds of gasification products in the event of closedown of the gasifier,or,as a precaution against a dangerous rise in bed temperature. A third auxiliary means 13 is provided at the entrance to the parallel conduit 27 for introducing a steam supply to in-mix with the input fuel,be it solid fuel or liquid fuel.

Various examples of the aspects of the gasification/combustion system will now be described.

Figure 2:
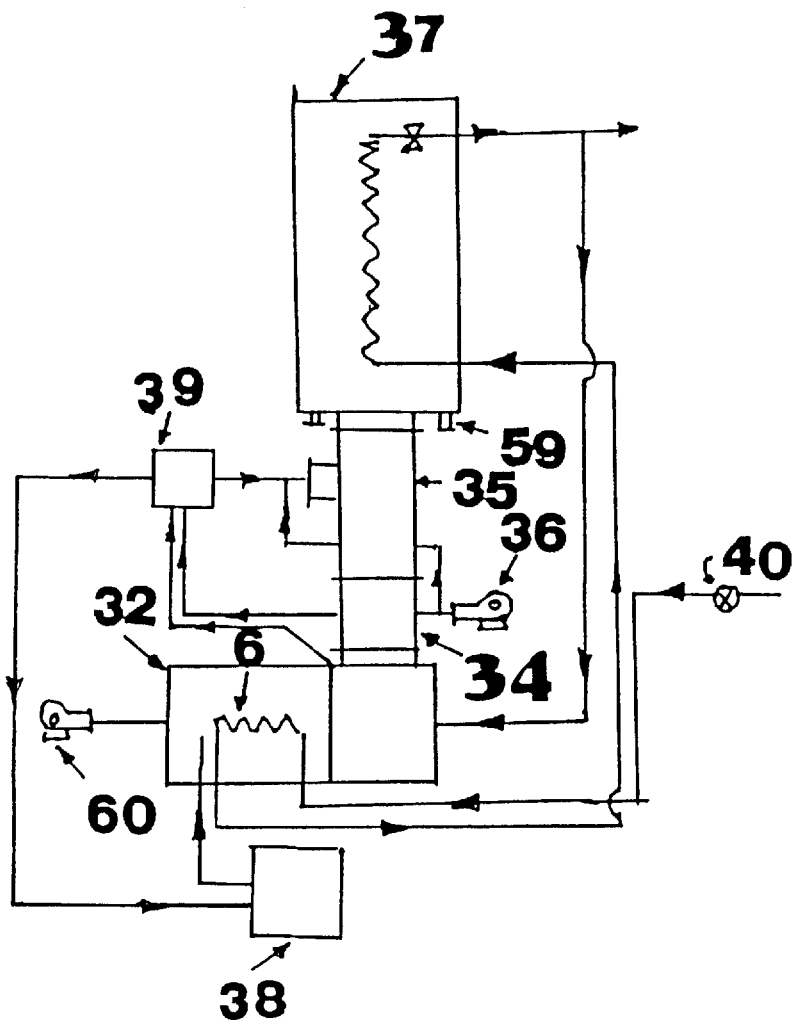
FIG. 2 is a block diagram of an atmospheric pressure gasification/combustion system fitted to a user appliance such as an industrial boiler or furnace.

Reference is made to FIG. 2 of the drawings,generally given the reference number 33.This is a gasification/combustion system at atmospheric gas pressure for providing a fuel gas from the gasifier 32 and which after passing through a gas cleaner 34 of the cyclone type enters an afterburner 35.Here the fuel gas is burned off by a staged oxidant supply from the fan 36. The resultant flame gases now enter a user appliance 37such as an individual boiler, furnace etc.Fuel storage 38 is provided by lockseal hoppers for solid fuels,or,in the case of liquid fuels,by storage tanks and associated connecting pipework etc.Bed material comprising carbon loss,spent sorbent and ash is conveyed from the gasifier and is also extracted from the gas flow by the gas cleaner 34 and conveyed along seperate pipes to a storage and seperation unit 39 in which the carbon is extracted by a double cyclone unit in series and recycled back to the afterburner 35 for final burn-off.The remaining ash and spent sorbent are extracted , respectively, from the secondary and primary cyclones,which are deliberately designed with low efficiencies,thus allowing the lightweight and finer size carbon to be exhausted from the secondary cyclone and recycled back to the gasifier 32 via the storage hopper 38(the first sorbent passing through a regenerator—not shown)The collected ash in the secondary cyclone is disposed of through its outlet.In some applications demanding high efficiency cleaning the secondary cyclone will be replaced by a ceramic porous cleaning unit with reverse flush cleaning of the ceramic surfaces when these become dirty through frequent use.In new boiler applications the gasifier coolant tube system 6 forms an extension of the boiler 37 feedwater circuit and preheats the feedwater by the boiler pump 40 pumping the feedwater through the gasifier coolant system prior to entering the boiler 37.The overall system with its clean gas production will reduce considerably the emissions of the pollutants nitrogen and sulphur oxides and reduce the level of $CO_2$ emissions due to its high operational efficiency.It would thus be an improvement over flue gas desulpherisation equipment currently being proposed for industrial plant to reduce these emissions since it would be lower in capital cost and raise,rather than reduce the plant efficiency. In retrofit applications to existing boilers where the existing heating surface cannot absorb the additional heat from the gasifier coolant tubes 6 then the gasifier may have to be designed for a lower eqivalence ratio with resultant lower coolant tube heating surface,or, perhaps none at all.

Figure 3:
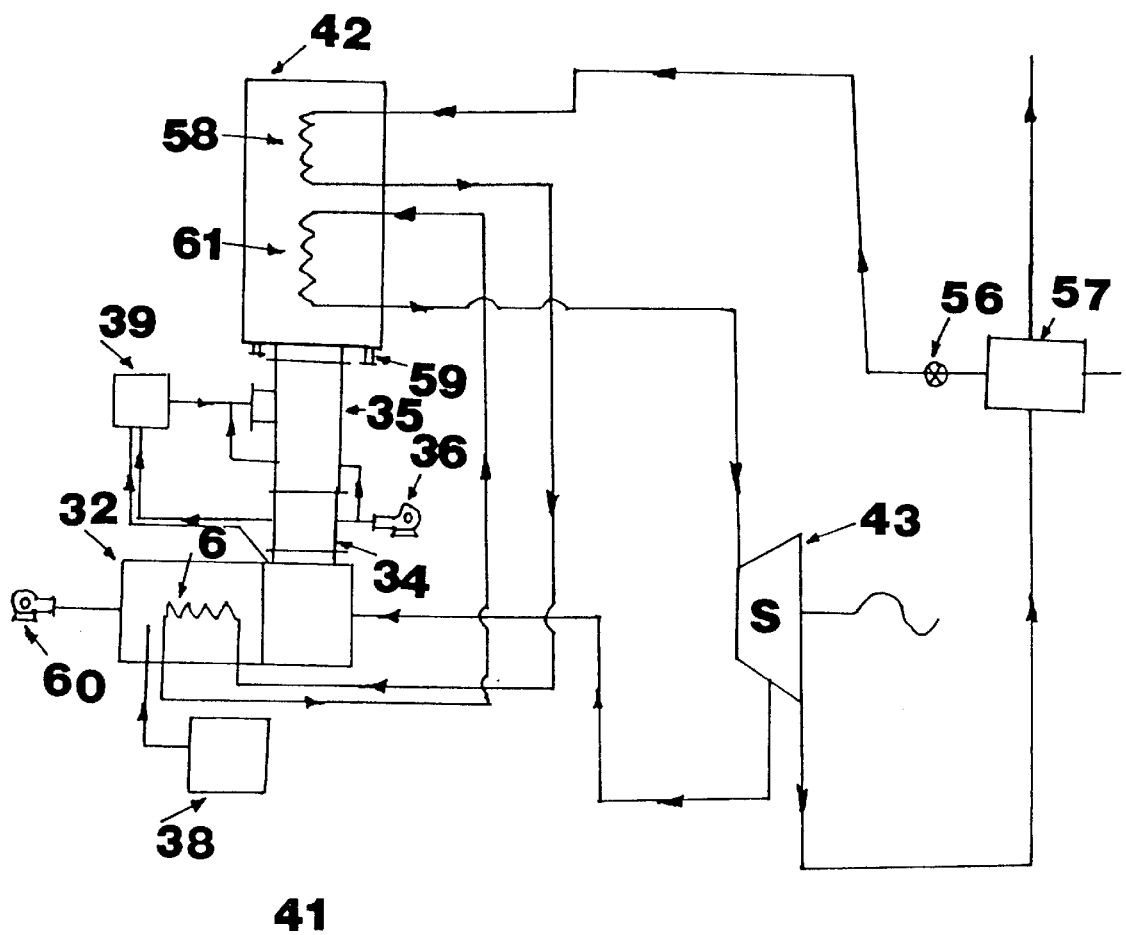
FIG. 3 is a block diagram of an atmospheric pressure gasification/combustion system fitted to a new,or as a retrofit,to a power station steam cycle power generation plant.

Reference is now made to FIG. 3 of the drawings generally given the reference number 41 and which is a gasification/combustion system at atmospheric gas pressure to provide a clean fuel gas and combustion system for existing,or, new,steam cycle,industrial or power station generation systems.The system utilises one or more gasifiers 32 with fans 60 arranged in a bank of units,vertically or in other suitable arrangement.For compactness the gasifiers can be designed as right and left hand models. The gasifiers generate fuel gas which flows through a common duct into gas cleaners 34 of the cyclone type and as in the FIG. 2 system the fuel gas is burned off in the afterburner 35 supplied by oxidant from the fan system 36.Similarily,for new or inefficient old plant, the gasifiers tube coolant tube system 6 is linked to the power station boiler 42 to further preheat the feedwater flowing from the boiler economiser 58.This means additional steam can be generated in the boiler 42 in the evaporation and superheater/reheat section 61,thus generating more power in the steam turbine 43.The fuel storage 38 and the storage and seperation unit 39 are of similar design to the FIG. 2 system.The remarks concerning the FIG. 2 coolant system also apply to this system in regard to the gasification/combustion system retrofitted to existing plant.The advantages of the system is that it can be used to upgrade existing plant at power stations with a possible gain in efficiency instead of a loss if flue gas desulpherisation plant is fitted.In addition, grinding of input fuel coal is no longer required with a subsequent saving in electrical costs. Furthermore, non-swelling to high swelling coals can be used.Switching to oil is a benefit if coal prices increase or availability is poor.If statutory requirements demand a reduction in $CO_2$ emissions natural gas burners 59 can be fitted to operate alongside the coal gasification plant.

Figure 4:
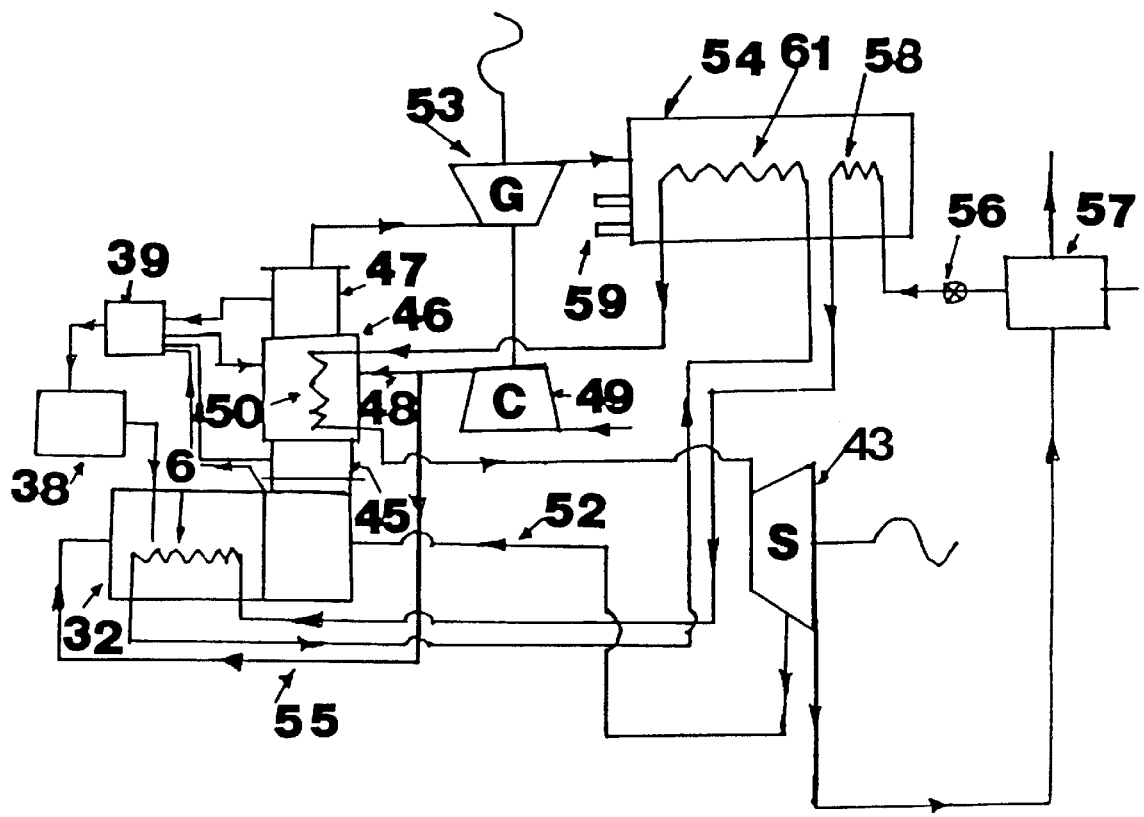
FIG. 4 is a block diagram of a pressurised gasification/combustion system fitted to a combined cycle power generation plant with booster clean gas burners to give very low levels of emissions of nitrogen and sulphur oxides and $CO_2$.

Reference is now made to FIG. 4 of the drawings, generally given the reference number 44 and which is a gasification/combustion system at pressurised gas pressure for a combined cycle power generation system,either for upgrading existing power, or, industrial plant,or,for new plant of the same type. The gasification/combustion system 44 utilizes multiple gasifiers 32 with the fuel gas entering a rear gas cleaner system 45 of the ceramic porous type. The fuel gas now enters the afterburner 46 being burned off by oxidant supply 48 supplied by the compressor 49. The oxidant supply 48 also supplies dilution oxidant to cool the combustion gases to the required temperature entering the gas turbine 53. The compressor also supplies oxidant through the ducts 55 to the gasifiers. The afterburner is fitted with superheater and reheat steam tubes 50 which raises the Rankine Cycle efficiency of the steam to the steam turbine 51. The steam flow to the gasifiers is supplied from the steam turbine via the pipes 52. On leaving the afterburner 46 the combustion gases pass through a front gas cleaning system 47 of the ceramic porous type. The clean gas now enters the gas turbine 53 generating electrical power and the exhaust gases now enter the boiler 54 generating a steam supply at high pressure. The steam circuit comprises preheated feedwater leaving the condenser 57 and being pumped by the pump 56 to the boiler economiser 58 from whence it flows to the gasifier coolant tube system 6. The flow then leaves the gasifier and enters the boiler 54 where after generating steam this leaves the boiler and enters the afterburner superheater/reheat unit 50. The steam now passes to the steam turbine 51 generating further electrical power and on being exhausted from the steam turbine the exhaust steam, alternatively, may be sent back to the superheater/reheat unit 50 for reheat prior to re-entering the steam turbine again. This improves the the steam power generation efficiency component of the overall combined cycle efficiency. Fuel storage 38 and the storage and seperation unit 39 are as described for the FIG. 2 system.

Figure 5:
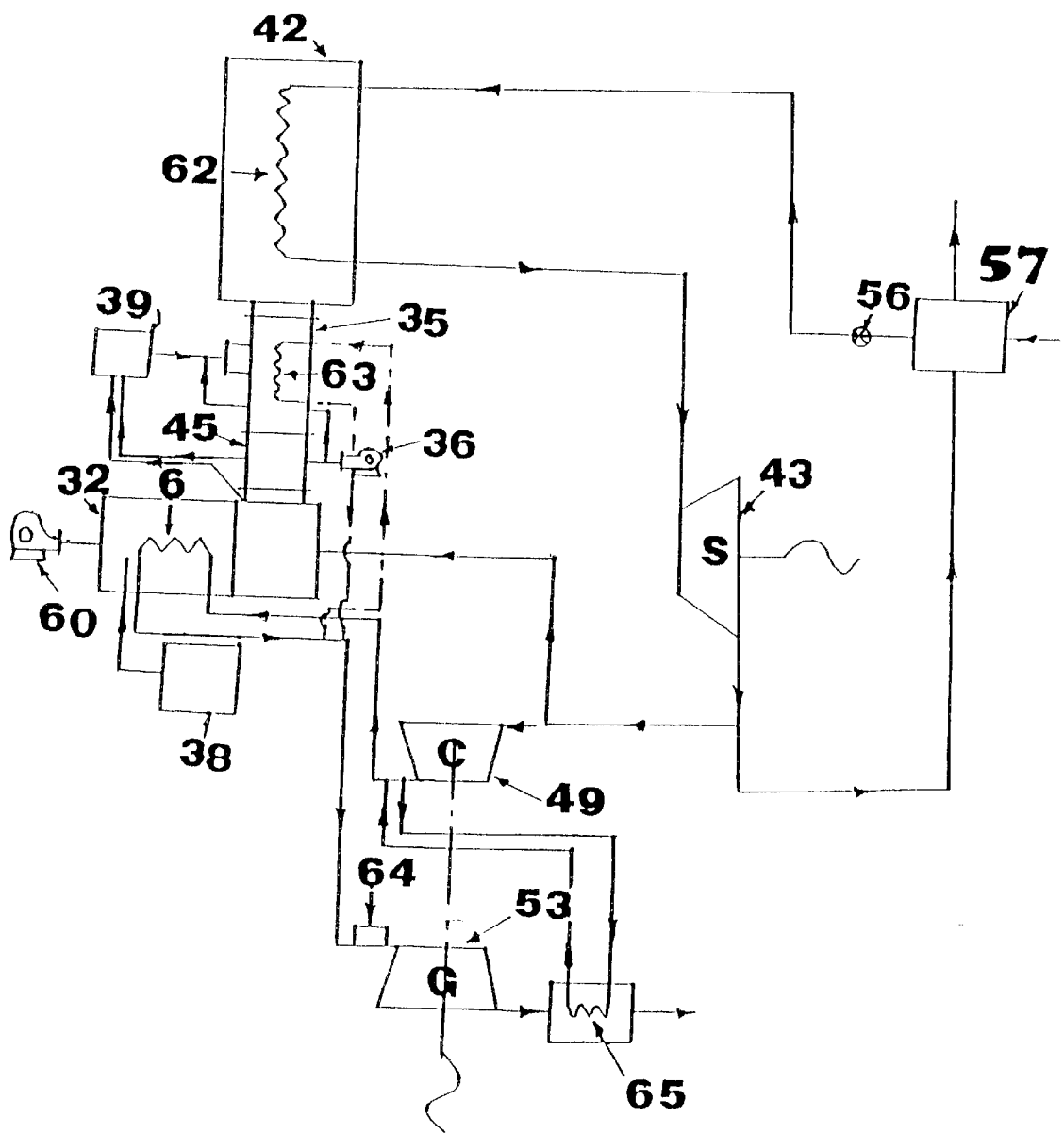
FIG. 5 is a combined cycle fluid tube/coil system.

Reference is now made to FIG. 5 of the drawings, generally given the reference number 66 and which is a gasification/combustion system at atmospheric gas pressure for use with conventional steam cycle power generation systems and for conversion of same to combined cycle systems by connecting a gas turbine set, utilising the hot coolant fluid (air) flowing through all, or some, of the fluid coolant tubes 65,6 and 63, located respectively, in the gas turbine exhaust duct,in the gasifier and in the afterburner. The gasifier 32 outlet connects with the rear gas cleaner 45, passing ash,spent sorbent and carbon to the storage seperation unit 39, in turn, passing clean fuel gas to the afterburner 35 wherein heat is transferred to the fluid coil 63 and the fuel gas and recycled carbon from the storage seperation unit 39 is burned off by oxidant from the fan 36. The final combustion flame gas from the afterburner outlet enters the steam cycle boiler 42, generating superheated/reheat steam in the boiler generating sections 62 said steam supply passing to the steam turbine 43,generating electrical power therein. Exhaust steam from said steam turbine 43 passes to the gasifier 32, generating fuel gas from fuel input from storage/delivery unit 38. The coolant tubes 6 absorb exothermic heat from the gasifier fluidised beds maintains the said beds at their working temperature. Pressurised air from the compressor 49 can pass to the gas turbine exhaust duct hot fluid tubes 65, therein increasing the compressor outlet air temperature.The compressor air can then pass through the gasifier coolant tubes 6 and finally through the afterburner coolant tube coil 63 wherein at its maximum air temperature the total airflow enters the gas turbine 53 generating further electrical power and converting the overall system to a combined cycle power generation system.The compressor/gas turbine arrangement can operate ,with,or without burners 64 depending on the design application requirements of total power output.

The advantages of the system 66 FIG. 5 is that existing steam cycle power generating systems,as fitted to power stations throughout the world,can be fitted directly with the gasifier without coolant tubes 6 and operated with an equivalence ratio,as near zero as possible, to minimise the exothermic heat release, supplying a clean higher calorific value fuel/combustion gas to the boiler to generate electrical power with reduced sulphur and nitrogen oxides and $CO_2$ emissions. Alternatively,to fit said steam cycle boiler plant with combined cycle gas turbine system as described above to generate additional electrical power with substantial increase in efficiency and at substantially reduced cost per kilowatt output. Said combined cycle system being lower in capital cost than installing a completely new power station plant and cheaper than biulding a new combined cycle natural gas or oilfired system.

In further aspects of the gasification/combustion system these can be utilised for engine power systems such as direct firing of gas turbines,gas engines etc.

In certain applications booster natural gas burners 59 FIGS. 2 and 5 can be fitted to the boiler inlet flange to boost the boiler output which are to be retrofits,or for new plant with the FIGS. 2, 3 and 4 systems,or in the cases where the emissions of sulphur and nitrogen oxides and $CO_2$ can be further reduced over and above the already low emissions for the gasification/combustion systems in this specification.

I claim:

1. A dual fuel fluidised bed gasifier for a pressurized gasification combustion system, said gasification combustion system having a fuel and an oxidant inlet means being coupled to a non-gaseous fuel source and an outlet means for providing fuel gas to a gasification source, said gasifier having a series of parallel adjacent fluidised bed gasification chambers the said chambers disposed in individual plenum chambers with said oxidant inlet means, the oxidant inlet means with individual damper controls controlling the distribution of the a oxidant supply through said oxidant means to said gasification chambers, said gasifier comprising dual input fuel, for input of solid or liquid fuels with accompanying sorbent, fed separately or simultaneously into said gasifier and said solid fuel conveyed through a lockseal hopper means to each said fluidised bed through a freeboard chamber and said liquid fuel fed through an inlet conduit thereby providing each distributor means to each said gasification chamber to equitably distribute liquid fuel through each said bed, each of said fluidised bed gasification chambers containing a coolant means, said coolant means comprising conduits in said fluidised bed gasification chambers, said conduits containing coolant fluid, whereby said conduits are provided with a sufficient conduit surface area to control bed temperature of said gasification chambers, each of said gasification chambers containing a fluidised bed, said bed fluidised by said oxidant supply means from a power driven unit into said inlet oxidant means through said damper controlled plenum chambers; thence, through said distribution means to fluidise each said bed of said gasification chambers, converting input fuel and ungasified carbon into a fuel gas, the said fuel gas collected in said freeboard chamber in which further conversion of bed elutriatied fuel carbon particles into fuel gas takes place, thereby allowing the converted fuel gas to flow into said outlet means to said gasification source, said lockseal hopper means for input of solid fuel, sorbent and recycled carbon to said gasification chambers, comprises a top inlet hopper, superimposed onto a first outflow valve, whereby the first outflow valve feeds into an intermediate hopper, which is superimposed onto a second outflow valve and the second outflow valve feeds into a base hopper, said first outflow valve opening and closing alternately with the second outflow valve thereby providing a lockseal at the gasification chambers and precluding escape of the fuel gas from the gasification chambers, a first auxiliary means comprising a first conduit to introduce premix gas to each said fluidised bed of the gasification chambers for ignition of said solid or liquid fuels with a retractable spark plug for ignition of said premix gas, a second auxiliary means comprising a second conduit to introduce an inert gas into said each bed of the gasification chambers to purge each said bed of combustion gases, a third auxiliary means comprising a third conduit to introduce steam into each said fluidised bed to generate fuel gas from the reactions within the said input fuel, oxidant and sorbent, said freeboard chamber disposed in proximity to said fluidised bed gasification chambers and said outlet means, said fluidised bed gasification chambers having porous distribution means, with low fluidization velocity to reduce elutriation losses, and said distributor means disposed at base of said gasification chambers between said chambers and individual plenum chambers, said transfer units located under a dividing wall of each said bed of said gasification chambers and adjacent to said distributor means for successive transfer of ungasified fuel carbon, ash and spent sorbent from each said gasification chamber; and, a final gasification chamber including a transfer unit for gasifying any remaining ungasified fuel carbon contained in the said input fuel into said transfer unit of the said final chamber, thereby, disposing of the sorbent ash and carbon into said lockseal hopper unit and said first output valve, and providing said final chamber with no other means of input fuel supply except for the remaining carbon from said gasification chambers.

2. A gasifier as in claim 1 with a computer control system operating said transfer units of each said fluidised bed of said gasification chambers in which to provide a constant calorific value and temperature of the fuel gas flow.

3. A gasifier as in either claim 1 or claim 2, further comprising a storage and separation unit with inlet means for recycling ash, spent sorbent and ungasified carbon and a delivery means for feeding recycled regenerated sorbent and ungasified carbon back into said gasifier.

* * * * *